United States Patent [19]
Craft

[11] 3,712,274
[45] Jan. 23, 1973

[54] ROTARY INTERNAL COMBUSTION ENGINE

[76] Inventor: Leonard F. Craft, Box 876, Andrews, Tex. 79714

[22] Filed: April 6, 1972

[21] Appl. No.: 241,648

[52] U.S. Cl. .............................................. 123/8.49
[51] Int. Cl. ................................................. F02b 53/04
[58] Field of Search ......... 123/8.49, 8.47, 8.45, 43 R, 123/43 A, 44 B, 44 D

[56] References Cited

UNITED STATES PATENTS

| | | | |
|---|---|---|---|
| 1,337,218 | 4/1920 | Glaze | 123/8.49 |
| 3,447,513 | 6/1969 | Schneider | 123/8.47 |

*Primary Examiner*—Clarence R. Gordon
*Attorney*—Marcus L. Bates

[57] ABSTRACT

A rotary internal combustion engine having a rotor journaled within a housing with a portion of the housing and rotor cooperating together to jointly form a combustion chamber which is brought into alignment each time the rotor is rotatably moved a specified angular amount relative to the housing depending upon the configuration of the combustion chambers located in the rotor and housing.

The combustion chamber is charged with air through a hollow sleeve which is received within the rotor. The sleeve and rotor are each provided with passageways which are indexed with one another so that flow occurs when the combustion chamber of the rotor and housing are aligned with one another.

Depending from the rotor are two shafts which are journaled to the housing with one of the shafts being counterbored so that it receives the before mentioned sleeve, as well as providing means for actuating a fuel pump. The remaining shaft end provides means by which power can be extracted from the engine.

10 Claims, 11 Drawing Figures

ROTARY INTERNAL COMBUSTION ENGINE

BACKGROUND OF THE INVENTION

Rotary internal combustion engines have been proposed in the prior art as exemplified by the Wankel engine. An internal combustion engine which avoids the necessity of reciprocating pistons received within a cylinder is extremely desirable in view of the small number of moving parts required by such a construction. By eliminating most of the moving parts, the friction is greatly reduced thereby effecting a substantial increase in the efficiency of the engine. Moreover, the elimination of moving parts such as valves, springs, and cams, greatly simplifies the construction and reduces the cost of the engine.

The elimination of the reciprocatory motion of the piston and connecting rod provides for an engine which is smooth in operation and more efficient in performance.

SUMMARY OF THE INVENTION

This invention comprehends a rotary internal combustion engine having a main body which rotatably houses a rotor therein, with the rotor having opposed shafts axially aligned with the body and depending from the rotor. An axial counterbore extends through one shaft and into the rotor while the remaining shaft provides means for a power take off.

A fixed hollow sleeve is received within the counterbore and has ports associated therewith which are indexed with a passageway leading to a combustion chamber jointly formed between the rotor and the body.

An exhaust port is formed within the housing in spaced apart relationship respective of the combustion chamber thereof so that when the rotor portion of the combustion chamber is brought into alignment with the port, exhaust gases flow from the engine.

A scavenging system comprising a cavity is formed within the rotor in alignment with an annulus which is formed in each end of the body so that when the cavity passes the portion of the combustion chamber within the body; gases flow therefrom, into the cavity, and out through the annulus. Cups formed outwardly of the rotor circulate air therethrough for cooling and scavenging purposes.

Accordingly, a primary purpose of this invention is to provide improvements in rotary internal combustion engines.

Another object of the invention is to provide a rotary internal combustion engine having improvements in the air flow system thereto.

A further object of this invention is to disclose and provide a rotary internal combustion engine with a plurality of combustion chambers which are disposed about the outer marginal edge portion of a rotor and about the inner marginal edge portion of a housing.

A still further object of this invention is to provide an internal combustion engine with an assembly which is rotatably received within a housing wherein the engine is cooled and scavenged in an improved manner.

Another and still further object is to provide a rotary internal combustion engine with improvements in the fuel flow system.

An additional object of this invention is to provide a super charged fuel injected rotary internal combustion engine which incorporates therein means by which the flow of air and fuel thereinto can be adjusted so that the flow occurs at the most optimum time relative to the angular relationship of the rotor and housing.

These and other objects and advantages of the invention will become readily apparent to those skilled in the art upon reading the following detailed description and claims and by referring to the accompanying drawings. The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
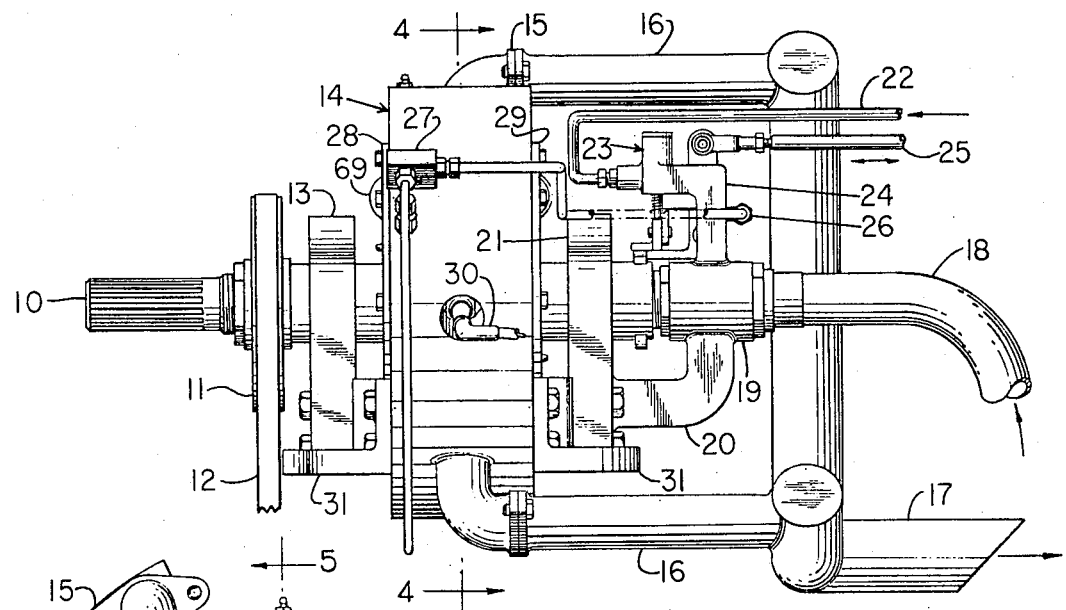
FIG. 1 is an elevational side view of a rotary internal combustion engine made in accordance with the present invention.
Figure 2:
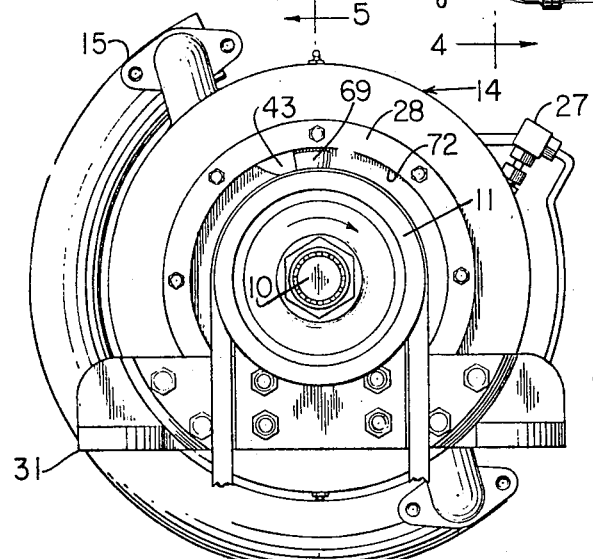
FIG. 2 is a front end view of the engine disclosed in FIG. 1.
Figure 3:
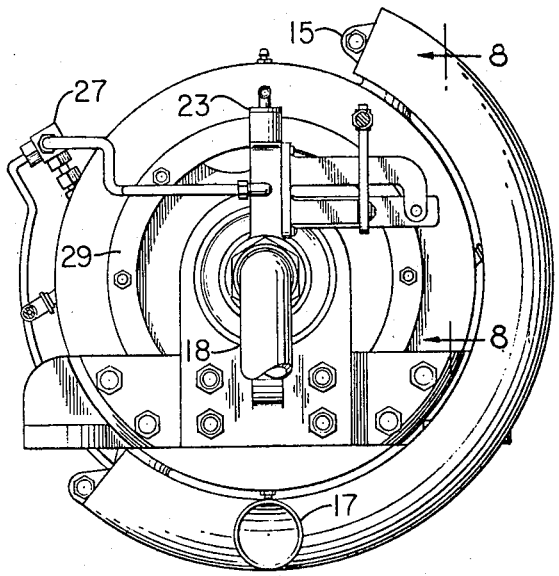
FIG. 3 is a rear end view of the engine disclosed in FIGS. 1 and 2.

As particularly disclosed in FIG. 1, in conjunction with some of the remaining figures, a rotary internal combustion engine has a splined power shaft 10 depending therefrom and to which there is attached a pulley 11 for driving super charger (not shown) having a drive belt 12. The power shaft includes a bearing support standard 13 which journals the shaft to the main body 14.

Outwardly depending from the outer peripheral wall surface of the main body are radially spaced apart exhaust ports 15 which are flow connected or tied into the manifold system 16 and provided with an outlet 17.

Air from the supercharger flows through conduit 18 and into a coupling member 19. The coupling is rigidly affixed to bracket 20 which in turn is affixed to a bearing support standard 21. The support standard has a journal therein for rotatably supporting part of the engine, as will be disclosed in greater detail later on.

Fuel inlet line 22 provides a source of fuel to injector pump assembly 23. The pump is mounted to the before mentioned coupling member 19 by means of the illustrated structure 24.

Pushrod 25 controls the rate of fuel flow through fuel outlet line 26. The outlet line is connected to fuel injector distributor 27, the details of which are known to those skilled in the art.

Spaced apart seal rings 28, 29 are bolted or otherwise affixed to the main body or housing and forms an annulus at each end of the body. The rings cooperate together with the housing so as to capture the rotor therewithin. Radially spaced apart glow plugs 30 outwardly extend from the body and are provided with the usual electrical connections by which current flow thereto can be effected.

Mounting lug 31 is bolted to each of the bearing standards and to the main body and provide support means for the before mentioned spaced apart journal means as well as arm 20 which supports the before mentioned coupling member and pump assembly.

Figure 4:
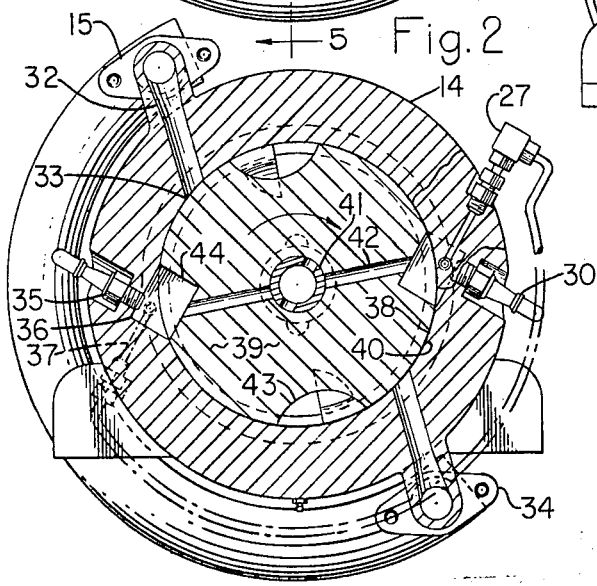
FIG. 4 is a part cross-sectional view taken along line 4—4 of FIG. 1.

Looking now to the details of FIG. 4, in conjunction with some of the remaining figures, exhaust outlet passageway 32 is provided with an inlet 33 which flow connects a combustion chamber to the before mentioned port 15 when the chamber is in flow contact therewith. An opposed port 34 is similarly arranged relative to its associate passageway and inlet.

A second glow plug 35 is threadedly engaged with the main body and extends into a combustion chamber 36. Fuel injection passageway 37 is flow connected to the before mentioned distributor.

The main body has an enlarged passageway extending longitudinally therethrough which forms a housing having an inside peripheral wall surface 38 for sealingly receiving a rotor 39 in close tolerance relationship therewithin. Accordingly, the outside peripheral surface area 40 of cylindrical portion of the rotor sealingly engages wall surface 38 of the housing. A fixed hollow sleeve 41 is axially aligned with the rotor and the main body. Ports 42 each have an inlet disposed adjacent to the sleeve and further include an outlet which is always in communication with the combustion chambers of the rotor.

A scavenging system includes a cooling and clean-out chamber 43 which is spaced apart from the rotor combustion chambers and extends longitudinally along a marginal edge portion of the rotor. Rotor combustion chamber 44 is formed within the rotor and cooperates with the fixed combustion chamber 36, for example, to jointly form an explosion chamber.

Figure 6:
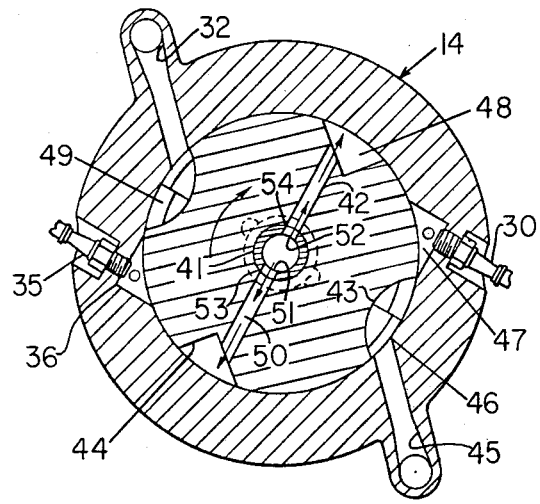
FIGS. 6 and 7 are part diagrammatical, part schematical, representations of a cross-sectional view as would be taken essentially along the same lines as FIG. 4.
Figure 7:
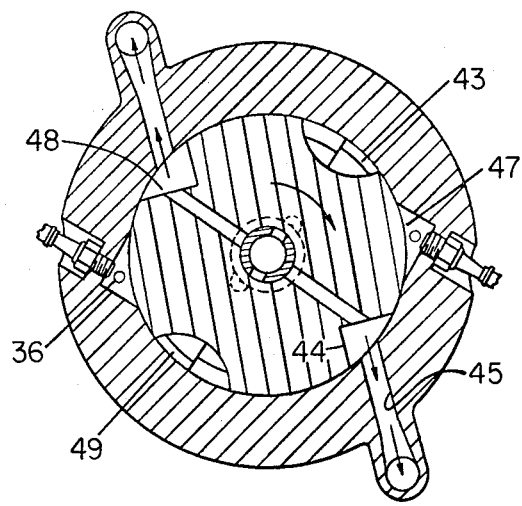

As particularly disclosed in FIGS. 6 and 7, wherein FIG. 6 illustrates the rotor in the intake position while FIG. 7 shows the rotor in the exhaust position, there is seen an exhaust passageway 45 having an inlet port 46 which is presently aligned in communication with the before mentioned cooling and clean-out chamber 43. Body cavity 47 forms part of a combustion chamber and is diametrically opposed to the before mentioned body cavity 36. Rotor cavity 48 is diametrically opposed to the before mentioned cavity 44 and cooperates with either of the body cavities to form the before mentioned combustion chamber.

Cooling and clean-out chamber 49 is diametrically opposed to chamber 43. Passageway 50 interconnects chamber 44 with the interior of the hollow sleeve when the diametrically opposed sleeve ports 51, 52 are brought into alignment with rotor ports 53, 54. In this particular embodiment, alignment occurs each 180° of travel of the rotor relative to the main body.

Figure 5:
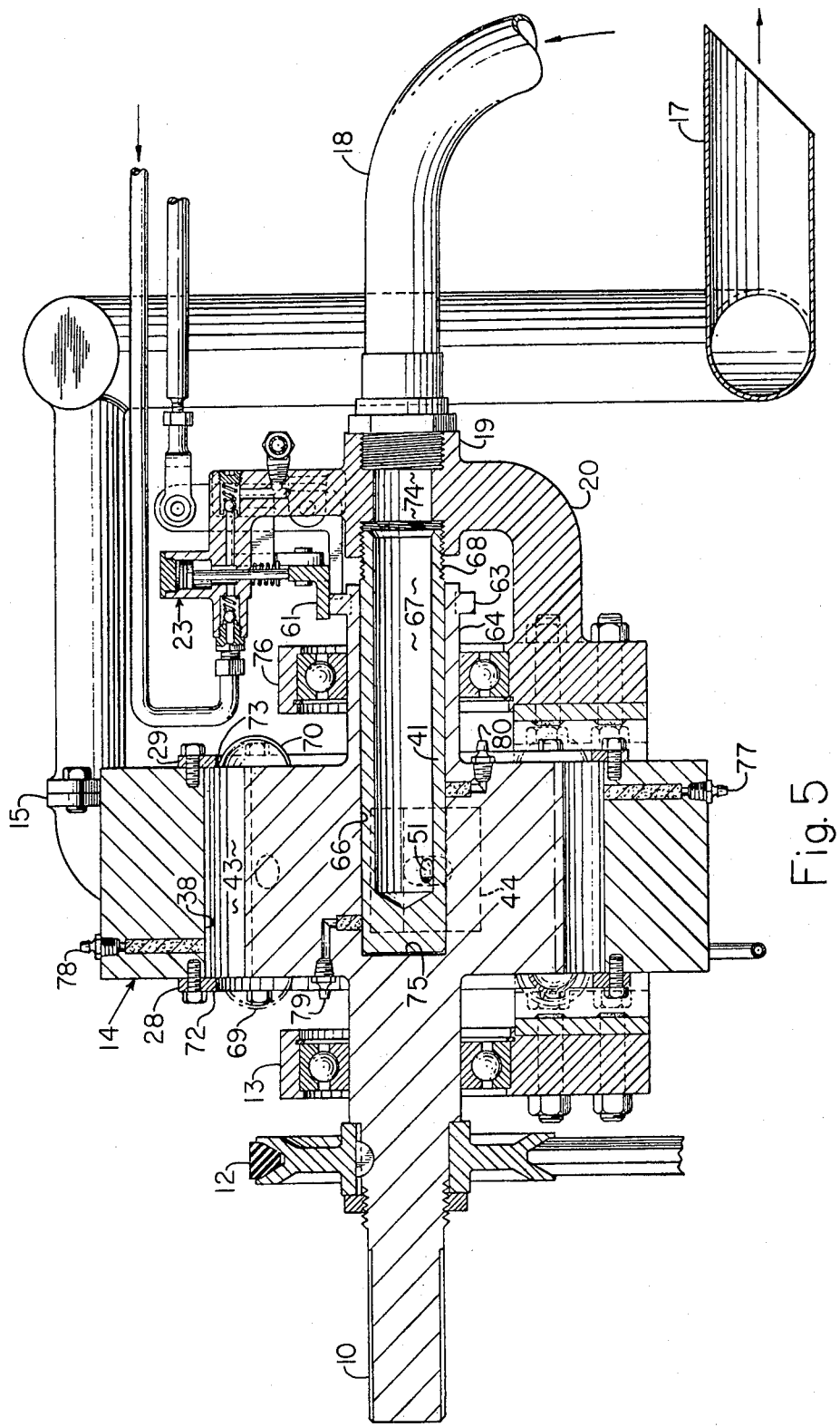
FIG. 5 is an enlarged, longitudinal, part cross-sectional view taken along line 5—5 of FIG. 2.
Figure 8:
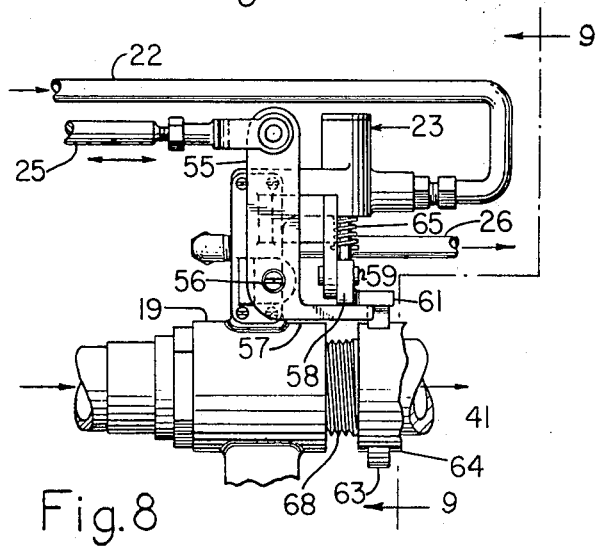
FIG. 8 is a fragmentary, enlarged, detailed view of part of the engine as seen looking in a direction indicated by the arrows at 8—8 in FIG. 3.
Figure 9:
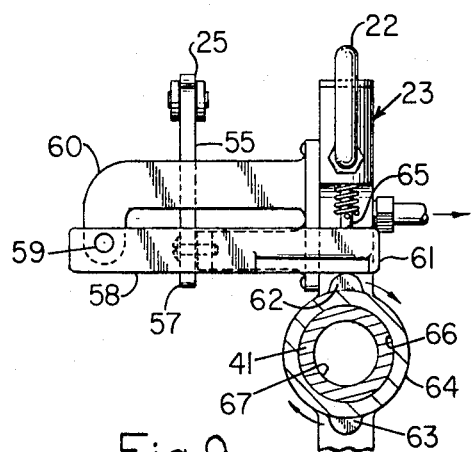
FIG. 9 is a fragmentary, part cross-sectional view, taken along line 9—9 of FIG. 8, with some additional parts being included so as to better disclose the apparatus.
Figure 10:
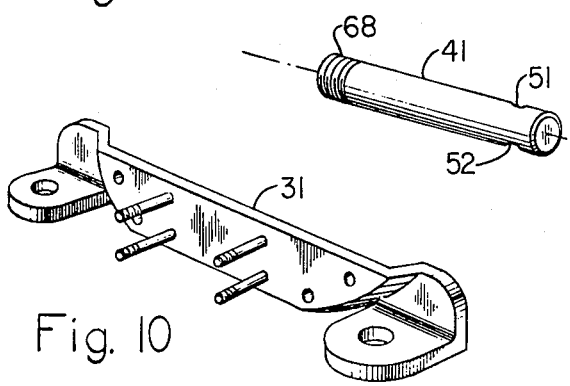
FIG. 10 is an enlarged detail of part of the apparatus seen in the foregoing figures; and, FIG. 11 is a disassembled perspective view of part of the apparatus disclosed in the foregoing figures.
Figure 11:
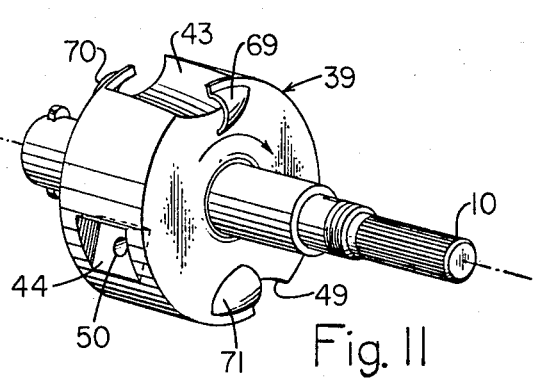

Looking now to the details of FIGS. 8 and 9, in conjunction with FIGS. 1 and 5, there is disclosed a bell crank 55 journaled at 56 and having a depending end 57 which underlies a limiting arm 58 with the arm being pivotally attached at 59 to a support 60. End 61 of the arm is actuated by lobes 62, 63 formed on the exterior surface of hollow shaft 64. Pump plunger 65 is biased in a downward direction and has a free depending end which engages a marginal end portion of the limiting arm 58.

Stationary hollow sleeve 66 has passageway 67 formed therein and is affixed to coupling member 19 by means of the threaded fastener 68. As seen illustrated in FIG. 9 together with FIG. 5, opposed oppositely directed cups 69, 70 define the end portions of the clean-out chamber, while a similar set of cups, one of which is seen at 71, are affixed to the end portions of the remaining clean-out chamber of the rotor in a similar manner. It will be noted that there is provided one clean-out chamber for each combustion chamber of the rotor.

The opposed seal plates have an inner circumferentially extending edge portion 72, 73 which sealingly engages and captures the rotor therewithin with the before mentioned cups outwardly extending therethrough in the illustrated manner of FIG. 5.

Member 19 is provided with an internal passageway 74 formed therein which is placed in flow communication with the before mentioned sleeve and intake pipe. The end portion of the sleeve abuts the bottom 75 of the counterbore of hollow shaft 64. Journal means 76, in the form of a ball bearing, supports the hollow shaft end. Fittings 77, 78 provide for a supply of lubricant for the sealed interface formed between the rotor and the main body while fittings 79, 80 enable the sleeve to be lubricated.

OPERATION

To start the engine the output shaft is caused to be rotated by any convenient means, thereby turning the rotor relative to the main body and at the same time the supercharger is driven by belt 12 so as to deliver a supply of air proportional to the speed of the engine into the intake pipe. Air flows through the stationary sleeve and when ports 51, 52, respectively, are aligned with ports 53, 54, respectively, air flows into combustion chambers 44, 48. As the hollow shaft of the engine rotates, the illustrated piston within the pump assembly is actuated by the action of the lobes located on the rear or hollow shaft. The lobes drive linkage 61 which in turn reciprocates the plunger of the pump. Push rod 25 sets the limiting linkage 57 so as to deliver the desired metered fuel flow to the engine.

Fuel flows from the pump, through outlet line 26, and to the fuel injection connection at 27, and on to each of the cylinders, with each cylinder receiving its proper portion of fuel and air each 180° of travel. Since each combustion chamber fires simultaneously, each 180° of travel of the rotor, it is necessary to provide 180° spaced apart lobes for driving the fuel injection system to thereby "time," or index the entrance of fuel into the combustion chambers.

The rotor and housing are in the relative position illustrated in FIG. 4 as the fuel and air are ignited. The force of the explosion forces the rotor into the illustrated position of FIG. 7, thereby exhausting gases from combustion chamber 44 as the gases travel through exhaust port 45. As the rotor continues in a clockwise direction, the clean-out chambers are brought into alignment with the housing combustion chamber portion, thereby scavenging the spent gases therefrom. Combustion chamber portion 44 of FIG. 7, for example, will next be aligned with combustion chamber portion 36, whereupon the relationship of passageways 42 and 50 will be reversed since air will next flow through port 51, 54, passageway 42, and into rotor chamber 48 which will be aligned with housing chamber 36.

As the rotor comes up to speed, cup 69 will induce ambient air to flow through clean-out chamber 43 and through outlet 70. This action cools the rotor and at the same time scavenges spent gases from the chambers associated with the body.

The position of the sleeve relative to the main body can be adjusted by torquing the threads 68. It is considered within the invention to provide means by which this adjustment ma be effected while the engine is operating. Furthermore, it is considered within the comprehension of this invention to adjust the relative position of the injection pump relative to the cams so as to inject fuel before or after the two combustion chambers are precisely aligned with one another.

By way of example, only two combustion chambers have been illustrated in the present embodiment; it will therefore be understood that any number and arrangement of rotor or housing combustion chambers may be employed in carrying out the present invention, and such a variation in design is considered to fall within the metes and bounds of the present intellectual property rights. Moreover, any number of adjacent rotors may be affixed to a common shaft so as to provide a plurality of banks of rotors housed within a common main body member and connected to a single output shaft.

It is furthermore possible to use spaced apart engines having the drive shafts thereof axially aligned and connected to the depending ends of a shaft of a generator, for example.

The present invention has one main moving part, specifically the rotor, and accordingly can be made rugged in design, low in cost, and has an extensively long life.

I claim:

1. A rotary internal combustion engine having a main body in the form of a housing, a rotor, opposed shafts axially aligned with and depending from said rotor, an axial counterbore extending through one shaft and into said rotor, journal means affixed to said main body and said shafts for supporting said rotor in aligned relationship relative to said housing so that the rotor can rotate within and relative to the housing;

a fixed sleeve received within said counterbore, means forming a port in said sleeve, a longitudinally extending passageway formed through said sleeve and flow connected to said port for connecting a source of air thereto;

a combustion chamber, said combustion chamber being jointly formed within said main body and within said rotor; means forming an intake passageway which interconnects said combustion chamber with said port; and means for admixing fuel with the air which flows to the combustion chamber;

means forming an exhaust port within said main body, said exhaust port being radially spaced apart from the portion of the combustion chamber which is located within said main body so that when the rotor rotates, the rotor portion of the combustion chamber is brought into alignment with the exhaust port to thereby exhaust at least part of the gases contained therein.

2. The engine set forth in claim 1, and further including means for axially rotating said fixed sleeve relative to said main body so as to selectively index the port in the sleeve with the intake passageway in the rotor.

3. The engine set forth in claim 1, wherein there is included a plurality of said combustion chambers, each spaced apart from one another; a port in said sleeve for each combustion chamber, and an exhaust port for each combustion chamber.

4. The engine set forth in claim 1, and further including a cam formed on one said shaft, a fuel pump actuated by said cam, a fuel line connected to each combustion chamber, said fuel pump being indexed relative to the position of the combustion chambers so as to inject fuel into the combustion chamber when the two chambers are properly aligned.

5. As a sub-combination of claim 4, said fuel pump having a limiting arm journaled to said pump and a bell crank for positioning said arm relative to said cam to thereby meter the fuel to the engine.

6. The engine set forth in claim 1, and further including means forming a clean-out chamber in said rotor, said clean-out chamber being radially spaced apart from said combustion chamber for scavenging air therefrom.

7. The engine of claim 6 wherein said clean-out chamber extends longitudinally through said rotor, a longitudinally extending annulus formed in said main body, said clean-out chamber being aligned with said annulus.

8. The engine of claim 7 and further including a cup formed on each end of said clean-out chamber for inducing air flow therethrough.

9. The engine of claim 1 wherein means forming a clean-out chamber is in said rotor, said clean-out chamber being radially spaced apart from said combustion chamber for scavenging air therefrom;

said clean-out chamber extends longitudinally through said rotor, a longitudinally extending annulus formed in said main body, said clean-out chamber being aligned with said annulus;

a cup formed on each end of said clean-out chamber for inducing air flow therethrough.

10. The engine of claim 9, and further including means for axially rotating said fixed sleeve relative to said main body so as to selectively index the port in the sleeve with the intake passageway in the rotor.

* * * * *